(12) United States Patent
Engels et al.

(10) Patent No.: US 11,784,429 B2
(45) Date of Patent: Oct. 10, 2023

(54) ELECTRIC PLUG-IN DEVICE AND ARRANGEMENT HAVING AN ELECTRIC PLUG-IN DEVICE

(71) Applicant: SIEMENS ENERGY GLOBAL GMBH & CO. KG, Munich (DE)

(72) Inventors: Engelbert Engels, Cologne (DE); Tim Schnitzler, Kreuzau (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 394 days.

(21) Appl. No.: 17/260,040

(22) PCT Filed: Jul. 11, 2019

(86) PCT No.: PCT/EP2019/068693
§ 371 (c)(1),
(2) Date: Jan. 13, 2021

(87) PCT Pub. No.: WO2020/011927
PCT Pub. Date: Jan. 16, 2020

(65) Prior Publication Data
US 2022/0006224 A1    Jan. 6, 2022

(30) Foreign Application Priority Data
Jul. 13, 2018    (DE) .......................... 102018211741.1

(51) Int. Cl.
*H01R 13/17* (2006.01)
*H01R 13/635* (2006.01)
*H01R 13/53* (2006.01)

(52) U.S. Cl.
CPC ............. *H01R 13/17* (2013.01); *H01R 13/53* (2013.01); *H01R 13/635* (2013.01); *H01R 2201/10* (2013.01)

(58) Field of Classification Search
CPC ...... H01R 13/17; H01R 13/53; H01R 13/635; H01R 2201/10; H01F 27/04; H02G 15/046; H01B 17/301
See application file for complete search history.

(56) References Cited

U.S. PATENT DOCUMENTS 3,861,777 A     1/1975  Clark
3,920,307 A *  11/1975  Burns .................... H01R 13/53
                                                          218/90

(Continued)

FOREIGN PATENT DOCUMENTS

DE       1929569 U    12/1965
DE       2410625 A1    9/1975
(Continued)

*Primary Examiner* — Travis S Chambers
(74) *Attorney, Agent, or Firm* — Laurence A. Greenberg; Werner H. Stemer; Ralph E. Locher

(57) ABSTRACT

An electric plug-in device, which is suitable for plugging into an electric receiving device, has an inner conductor and an insulating body which encloses the inner conductor. The plug-in device has: a main element, which can be fixed indirectly, in particular with the involvement of a housing wall, or directly to the receiving device and which encloses the inner conductor and insulating body; a pusher element, which can be displaced relative to the main element; and a spring device, which, after the plug-in device has been plugged into the receiving device, exerts an axial spring force on the pusher element in the direction towards the receiving device.

15 Claims, 4 Drawing Sheets

(56) References Cited

U.S. PATENT DOCUMENTS

| | | | | |
|---|---|---|---|---|
| 5,916,002 A | * | 6/1999 | Gottschalk | H01R 13/53 |
| | | | | 439/839 |
| 10,685,772 B2 | | 6/2020 | Ettl | |
| 2001/0034146 A1 | * | 10/2001 | Bungo | H01T 13/05 |
| | | | | 439/127 |
| 2019/0315238 A1 | * | 10/2019 | Meckenstock | B60L 50/64 |

FOREIGN PATENT DOCUMENTS

| | | |
|---|---|---|
| DE | 102007022641 A1 | 11/2008 |
| DE | 102016207405 A1 | 11/2017 |
| EP | 0148394 A2 | 7/1985 |
| EP | 2515313 A1 | 10/2012 |
| EP | 3148010 A1 | 3/2017 |
| EP | 3174165 A1 | 5/2017 |
| EP | 3185365 A1 | 6/2017 |

* cited by examiner

ELECTRIC PLUG-IN DEVICE AND ARRANGEMENT HAVING AN ELECTRIC PLUG-IN DEVICE

BACKGROUND OF THE INVENTION

Field of the Invention

The invention relates to an electric plug-in device which is suitable for plugging into an electric receiving device and has an inner conductor and an insulating body which encloses the inner conductor. The electric plug-in device can be, for example, a high-voltage bushing which can be plugged in, and the electric receiving device can be an apparatus connection part of an electrical apparatus.

In general, a high-voltage bushing has the task of insulating a high-voltage line, which is at high-voltage potential and has a current-conducting current conductor, from an environment that is substantially at ground potential, for example an apparatus wall of the high-voltage installation. Such a high-voltage bushing is known, for example, from DE 10 2007 022 641 A1. Said document discloses a transformer, the housing of which has an apparatus connection part, into which a high-voltage bushing can be plugged for connection of the transformer to a high-voltage network. The use of such a high-voltage bushing which can be plugged in makes it possible to construct and to commission the transformer with the high-voltage bushing with as little outlay on installation as possible.

SUMMARY OF THE INVENTION

The invention is based on the object of specifying a plug-in device with which the risk of an electrical breakdown in the contact region between the electric plug-in device and the electric receiving device is particularly low.

This object is achieved according to the invention by an electric plug-in device having the features as claimed. Advantageous refinements of the plug-in device according to the invention are specified in dependent claims.

It is accordingly provided according to the invention that the plug-in device has: a main element which is connectable indirectly, in particular with the involvement of a housing wall, or directly fixedly to the receiving device and which comprises the inner conductor and the insulating body, a pusher element which is displaceable relative to the main element, and a spring device which—after the plug-in device has been plugged into the receiving device—exerts an axially acting spring force on the pusher element in the direction of the receiving device.

A substantial advantage of the plug-in device according to the invention can be seen in the fact that the spring device which is provided according to the invention and presses the pusher element in the direction of the receiving device makes it possible for an insulating material, which is located between the insulating body of the plug-in device and the receiving device, to be brought into close contact both with the insulating body of the plug-in device and with the receiving device such that an air gap can be avoided between the insulating body and the receiving device and the risk of electrical arcing due to an air gap in this region is minimized.

A further advantage of the plug-in device according to the invention consists in that the spring device can absorb expanding or shrinking of the insulating material mentioned in the event of temperature fluctuations: if, for example, the insulating material expands, the spring device can yield and can permit the required increase in volume; in the event of a temperature reduction or shrinking of the insulating material, the spring device can push the pusher element further into the receiving device, reduce the volume for the insulating material and avoid formation of a gap.

The insulating material can be attached to the inner wall of the receiving device; however, it is considered to be particularly advantageous if the insulating material is attached to the insulating body. In the last-mentioned variant, the insulating material therefore forms an outer layer of the main element on the insulating body.

The insulating material can be attached fixedly in an advantageous manner to the insulating body of the main element, in particular can be sprayed thereon; alternatively, it can be pushed releasably onto the insulating body of the main element. In the last-mentioned variant, the insulating material can be exchanged particularly simply in the event of wear.

The insulating material is preferably a plastically and/or elastically deformable material. It is particularly advantageous if the insulating material is silicone material or at least also contains the latter.

The pusher element preferably has a pressure surface which extends radially outward, as seen from the inner conductor, and lies on the insulating material.

The surface normal of the pressure surface preferably lies parallel to the longitudinal axis of the inner conductor or at an angle with respect to said longitudinal axis. The pressure surface is particularly preferably tilted away rearward and is at an angle of between 60° and 80° with respect to the longitudinal axis of the inner conductor.

It is considered advantageous if the pusher element is formed by a ring, in the ring interior of which the insulating body and the inner conductor are arranged. The ring or the pusher element is preferably rotationally symmetrical about the longitudinal axis of the inner conductor.

The plug-in device preferably forms a high-voltage bushing which can be plugged in and which can be pushed into an apparatus connection part of an electrical apparatus.

The insulating body preferably comprises field-controlling control inserts which are separated from one another by insulating layers. The control inserts are preferably arranged concentrically around the inner conductor.

It is also advantageous if the insulating body tapers conically in the direction of the receiving device, and the insulating material is formed by a silicone cone, the inner boundary layer of which rests on the insulating body and the outer boundary layer of which lies on the inner wall of the receiving device after the plug-in device has been pushed into the receiving device.

The invention also relates to an arrangement having a plug-in device, as has been described above, and a receiving device, into which the plug-in device is pushed.

Furthermore, the invention relates to an arrangement having an electrical apparatus with a fluid-tight housing. According to the invention, the arrangement comprises a plug-in device, as has been described above. The apparatus has an apparatus connection part which is inserted into an opening in the housing; the plug-in device is plugged into the apparatus connection part and is connected by its inner conductor to a contact device of the apparatus connection part.

The invention will be explained in more detail below with reference to exemplary embodiments.

DETAILED DESCRIPTION OF THE INVENTION

In the figures, for the sake of clarity, identical or comparable components are always provided with the same reference signs.

Figure 1:
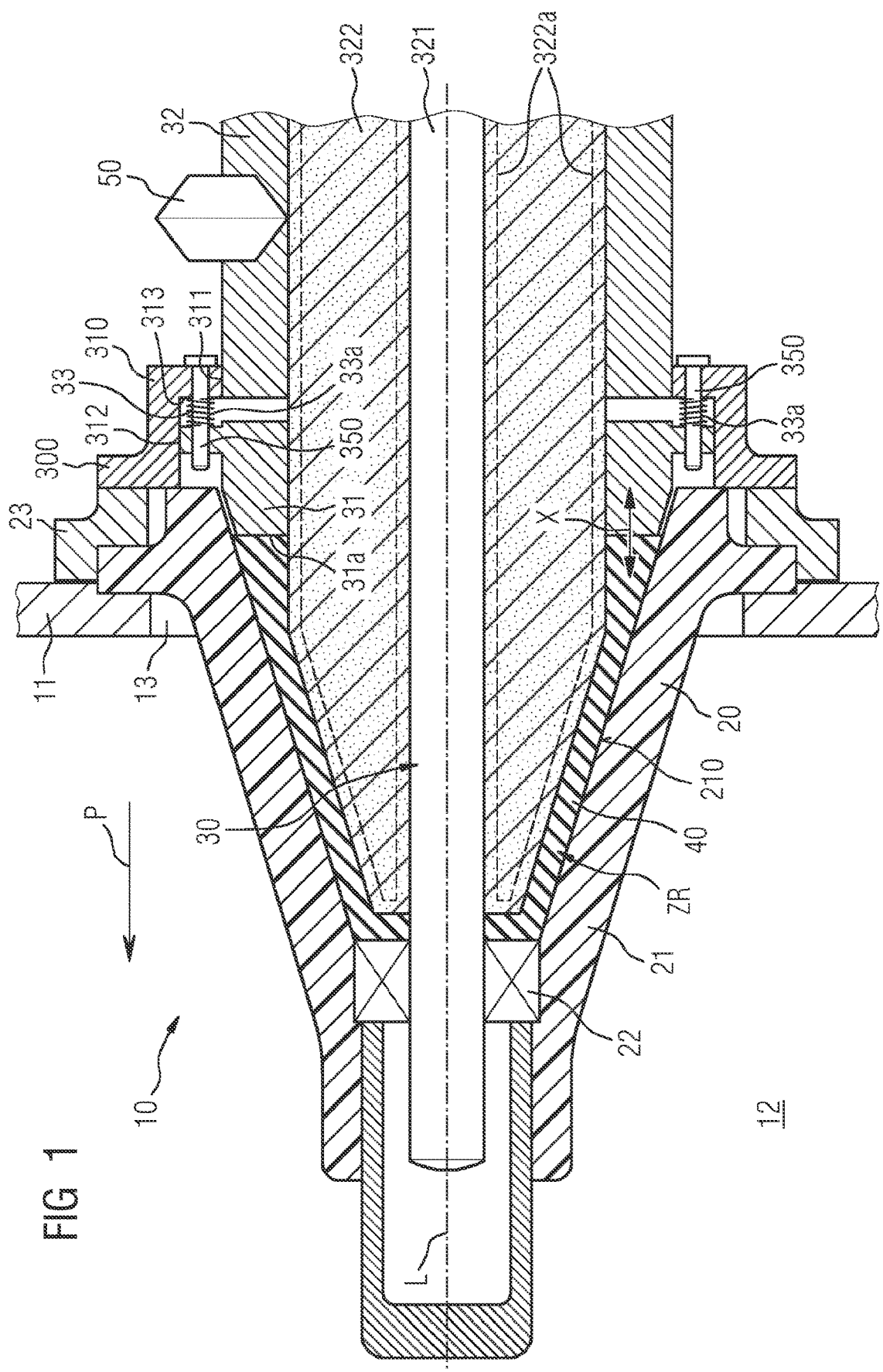
FIG. 1 shows an exemplary embodiment of a plug-in device in which an insulating material is sprayed fixedly on an insulating body.

FIG. 1 shows a section of an exemplary embodiment of an electrical apparatus 10, which is preferably a transformer. The apparatus 10 has a housing wall 11 which delimits an interior 12 of the apparatus 10. Electrical components, not illustrated specifically, of the apparatus 10 and an insulating oil are located in the interior 12.

The housing wall 11 is provided with an opening 13 which is closed in a fluid-tight manner by an electric receiving device 20 which forms an electric apparatus connection part of the apparatus 10.

The receiving device 20 comprises an electrically insulating insulating section 21 (preferably made of casting resin) and a contact system 22. The contact system 22 is connected to at least one electrical component of the electric apparatus 10 via lines, not illustrated in detail further.

In the illustration according to FIG. 1, a plug-in device 30 in the form of a high-voltage bushing which can be plugged in and serves for making contact with the at least one electrical component of the electric apparatus 10 is pushed into the receiving device 20 along an arrow direction P. The plug-in device 30 comprises a pusher element 31, a main element 32 and a spring device 33.

A holding section 300 of the main element 32 serves for fastening the plug-in device 30 to fastening means 23 of the receiving device 20 after the plug-in device 30 has been pushed into the receiving device 20. Alternatively or additionally, the plug-in device 30 can also be attached, in particular screwed, to the housing wall 11.

The main element 32 comprises an inner conductor 321 which, when the plug-in device 30 is plugged in, makes electrical contact with or is connected electrically to the contact system 22 of the receiving device 20. The inner conductor 321 is enclosed by an insulating body 322 which tapers conically or converges conically in the direction of the contact system 22 of the receiving device 20.

The insulating body 322 is preferably a casting resin body. The casting resin body comprises control inserts which are not illustrated further for reasons of clarity and of which, for example, one or more can be connected to measurement connections 50. The control inserts are preferably arranged concentrically around the inner conductor 321 and are separated from one another by insulating layers (e.g. made of PET nonwoven fabric), which are not illustrated further.

The insulating body 322 is particularly preferably a body made of resin-impregnated paper. The inserted control inserts just do not reach as far as the surface of the insulating body, this being depicted pictorially by means of a separating line 322a in the insulating body 322.

Between the insulating body 322 of the main element 32 and an inner wall 210 of the insulating section 21 of the receiving device 20, when the main element 32 is plugged in, there is a gap-shaped intermediate space which is filled with a plastically and/or elastically deformable insulating material 40. In the exemplary embodiment according to FIG. 1, the insulating material 40 is attached fixedly to the insulating body 322, in particular is sprayed thereon, and thus forms part of the main element 32. The insulating material 40 is preferably a silicone material.

The pusher element 31 is preferably formed by a ring which is placed onto the insulating body 322 and is displaceable thereon along the arrow direction X. The ring is preferably rotationally symmetrical.

The pusher element 31 can—as shown in FIG. 1—by way of example form a flange section which is displaceable in relation to the main element 32 and encircles the longitudinal axis L of the inner conductor 321 in a rotationally symmetrical manner.

The ring surface of the ring or of the pusher element 31, said ring surface facing away from the main element 32 and facing the receiving device 20, forms a pressure surface 31a which lies on the insulating material 40.

It is considered particularly advantageous if the pressure surface 31a extends radially outward, as seen from the inner conductor 321, and is adjacent to the insulating material 40. In the exemplary embodiment according to FIG. 1, the orientation of the pressure surface 31a is selected in such a manner that the surface normal of the pressure surface 31a is parallel to the longitudinal axis L of the inner conductor 321.

FIG. 1 also reveals that the plastically and/or elastically deformable insulating material 40 preferably forms a conical, pot-like element which has an inner surface resting on the insulating body 322, an outer surface lying on the inner wall 210 of the receiving device 20, a front surface located at the front end of the insulating body 322, and a rear surface which is remote from the front surface and extends radially outward. The pusher element 31 which pushes the insulating material 40 forward in the direction of the front surface lies on the rear radial surface.

The pusher element 31 is preferably arranged within a sleeve section 310 of the main element 32 and is displaceable axially within the sleeve section 310—along the longitudinal axis L of the inner conductor 321. The sleeve section 310 is preferably rotationally symmetrical about the longitudinal axis L of the inner conductor 321.

It is advantageous if the sleeve section 310 has a first subsection 311 and a second subsection 312, as seen along the longitudinal axis L. The second subsection 312 is larger in terms of diameter than the first subsection 311 and serves for receiving the pusher element 31. A radial stop surface 313 which separates the two subsections 311 and 312 from each other serves for supporting the spring device 33, which pushes the pusher element 31 and therefore the pressure surface 31a onto the insulating material 40 along the arrow direction X.

The compressive force of compression springs 33a of the spring device 33 leads to the pusher element 31 being pushed in the direction of the front end of the main element 32 or in the direction of the contact system 22, as a result of which in turn the insulating material 40 is pressed onto the adjacent conical section of the insulating body 322 and onto the inner wall 210 of the receiving device 20, and the intermediate space ZR between the insulating body 322 and the insulating section 21 of the receiving device 20 is filled with the insulating material 40 without an air gap remaining.

The risk of electrical arcing in the region of the intermediate space ZR is thereby considerably reduced.

In the exemplary embodiment according to FIG. 1, the compression springs 33a are each plugged onto a guide bolt 350 and are guided by the latter.

The spring device 33 preferably comprises at least three compression springs 33a arranged in a rotationally symmetrical manner around the longitudinal axis L of the inner conductor 321.

Figure 2:
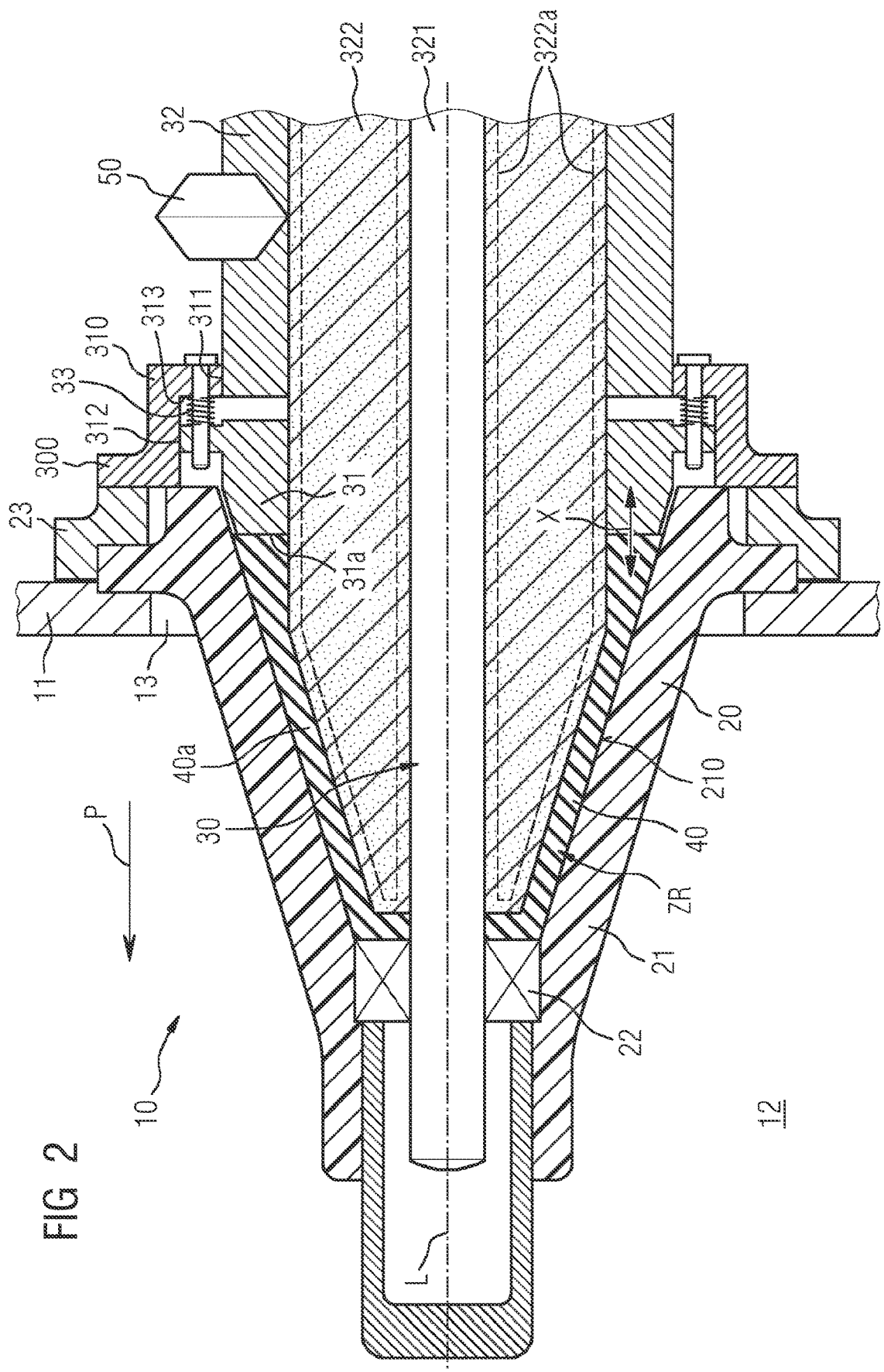
FIG. 2 shows an exemplary embodiment of a plug-in device according to the invention in which a separate insulating element made of insulating material is pushed onto an insulating body of the plug-in device.

FIG. 2 shows an exemplary embodiment of a plug-in device 30 which substantially corresponds in terms of its structure to the plug-in device 30 according to FIG. 1. However, in contrast to the exemplary embodiment according to FIG. 1, in the case of the plug-in device 30 according to FIG. 2 insulating material is not sprayed onto the insulating body 322; instead, a separate tube- or sleeve-shaped insulating element 40a is provided which is composed of insulating material 40, tapers conically and is pushed onto the insulating body 322. In the configuration according to FIG. 2, it is thus possible to replace the insulating material 40 after possible wear by the insulating element 40a being removed from the insulating body 322 and being replaced by a new insulating element 40a.

The insulating element 40a is preferably rotationally symmetrical about the longitudinal axis L of the inner conductor 321.

Otherwise, the statements in conjunction with FIG. 1 apply correspondingly.

Figure 3:
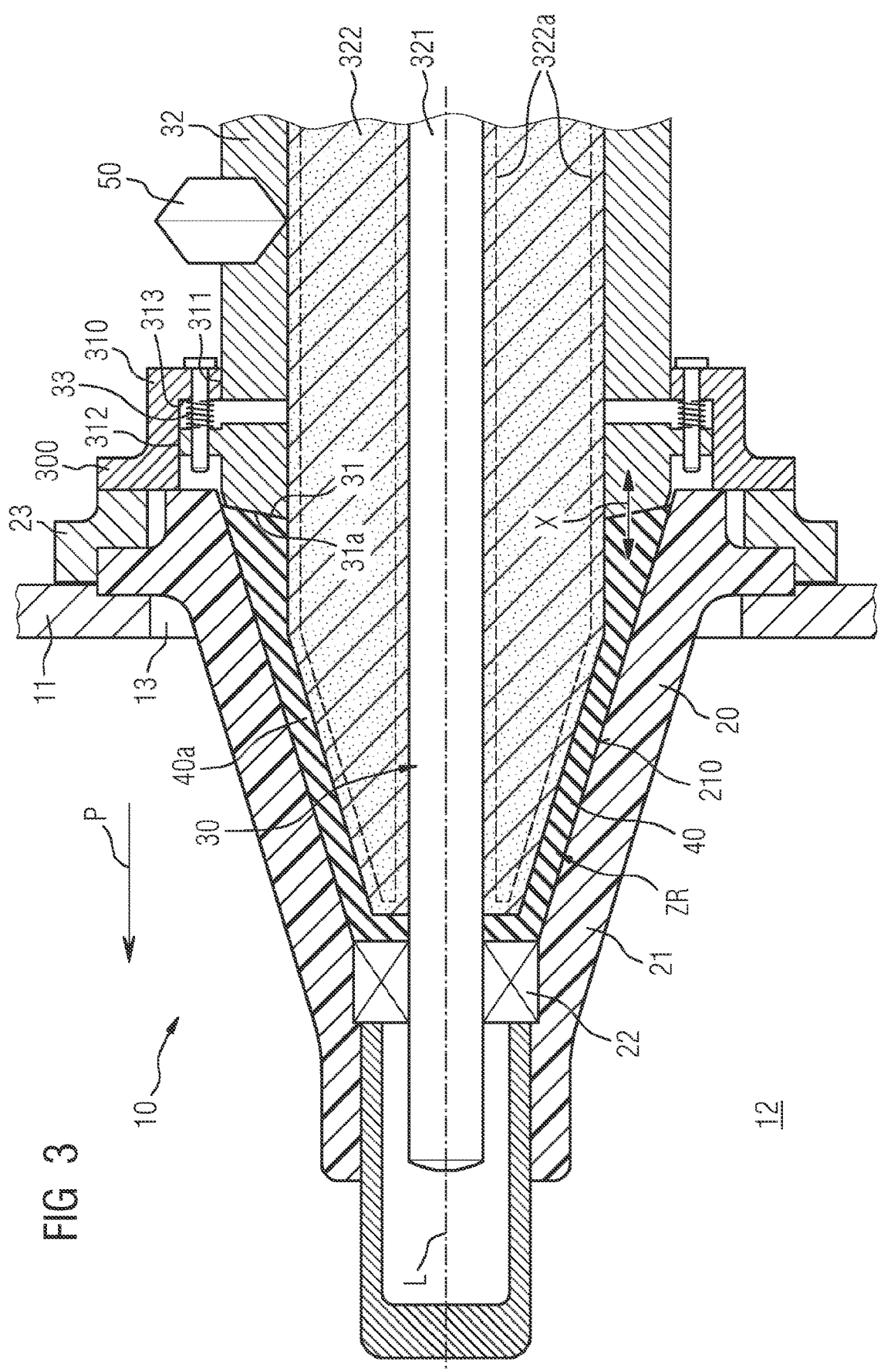
FIG. 3 shows an exemplary embodiment of a plug-in device according to the invention in which a pressure surface is arranged at a non-perpendicular angle with respect to the axis of rotation of the inner conductor.

FIG. 3 shows an exemplary embodiment of a plug-in device 30 according to the invention, in which the pressure surface 31a of the pusher element 31 is tilted away rearward (i.e. in the direction of the measurement connections 50 and away from the contact system 22) and is arranged at an angle of between 45° and 90°, preferably at an angle of between 60° and 80° with respect to the longitudinal axis L of the inner conductor 321. Such an angle or such an orientation of the pressure surface 31a is particularly advantageous for field-electric reasons.

Otherwise, the statements in conjunction with FIG. 1 and FIG. 2 apply correspondingly.

Figure 4:
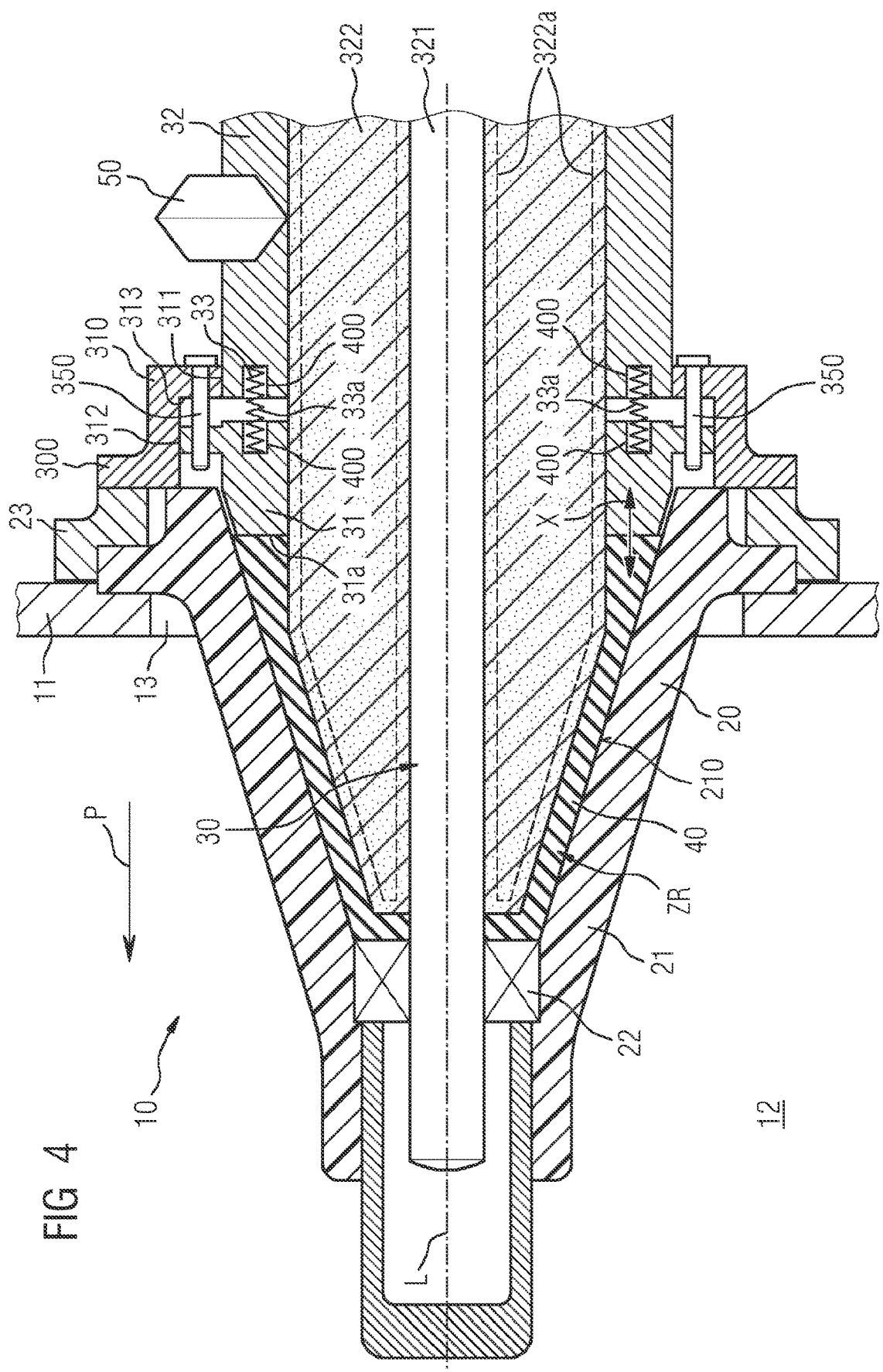
FIG. 4 shows an exemplary embodiment of a plug-in device according to the invention with a spring device which is configured differently—in comparison to the exemplary embodiments according to FIGS. 1 to 3.

FIG. 4 shows an exemplary embodiment of a plug-in device 30 according to the invention, in which the springs 33a of the spring device 33 project into the pusher element 31 and the base element 32. In the exemplary embodiment, the springs 33a are not plugged onto a guide bolt 350 and guided by the latter, as is the case in the exemplary embodiments according to FIGS. 1 to 3, but rather are held solely in recesses 400 which are formed in the pusher element 31 and in the base element 32. The recesses are preferably blind holes.

Otherwise, the statements in conjunction with FIGS. 1 to 3 apply correspondingly.

Although the invention has been illustrated and described in detail by preferred exemplary embodiments, the invention is not restricted by the examples that have been disclosed and other variations can be derived therefrom by a person skilled in the art without departing from the scope of protection of the invention.

LIST OF REFERENCE SIGNS

10 Apparatus
11 Housing wall
12 Interior
13 Opening
20 Receiving device
21 Insulating section
22 Contact system
23 Fastening means
30 Plug-in device
31 Pusher element
31a Pressure surface
32 Main element
33 Spring device
33a Compression spring
40 Insulating material
40a Insulating element/silicone cone
50 Measurement connection
210 Inner wall
300 Holding section
310 Sleeve section
311 Subsection
312 Subsection
313 Stop surface
321 Inner conductor
322 Insulating body
322a Separating line
350 Guide bolt
400 Recesses
L Longitudinal axis
P Arrow direction
X Arrow direction
XR Intermediate space

The invention claimed is:

1. An electric plug-in device for plugging into an electric receiving device, the electric plug-in device comprising:
    a main element configured to be fixedly connected to the receiving device, said main element having an inner conductor and an insulating body enclosing said inner conductor;
    said insulating body having field-controlling control inserts that are separated from one another by insulating layers;
    a pusher element that is displaceable relative to said main element; and
    a spring device which, when the plug-in device has been plugged into said receiving device, is configured to exert an axially acting spring force on said pusher element in a direction of the receiving device.

2. The electric plug-in device according to claim 1, wherein said main element is configured to be directly connectible to the receiving element or indirectly by way of a housing wall.

3. The electric plug-in device according to claim 1, wherein said pusher element is a ring with a ring interior, and wherein said insulating body and said inner conductor are disposed in said ring interior.

4. The electric plug-in device according to claim 1, wherein said pusher element is a rotationally symmetrical ring.

5. The electric plug-in device according to claim 1, wherein:
    the plug-in device is a high-voltage bushing configured to be plugged in; and
    said main element is configured to be pushed into an apparatus connection part of an electrical apparatus.

6. The electric plug-in device according to claim 1, wherein said control inserts are arranged concentrically around said inner conductor.

7. An arrangement, comprising:
    the plug-in device according to claim 1; and
    the receiving device configured to receive said plug-in device.

8. An arrangement, comprising:
an electrical apparatus with a fluid-tight housing, said apparatus having an apparatus connection part disposed in an opening formed in said housing; and
the plug-in device according to claim 1, said plug-in device being configured for plugging into said apparatus connection part and for said inner conductor to be connected to a contact device of said apparatus connection part.

9. The electric plug-in device according to claim 1, further comprising an insulating material fixedly attached to said insulating body, and wherein said pusher element adjoins said insulating material.

10. The electric plug-in device according to claim 9, wherein said insulating material is sprayed onto said insulating body or releasably pushed onto said insulating body.

11. The electric plug-in device according to claim 9, wherein said insulating material is a plastically and/or elastically deformable material.

12. The electric plug-in device according to claim 9, wherein said insulating material is silicone material.

13. The electric plug-in device according to claim 9, wherein:
said insulating body tapers conically in the direction of the receiving device; and
said insulating material is a silicone cone having an inner boundary layer resting on said insulating body and an outer boundary layer lying on an inner wall of the receiving device after the plug-in device has been pushed into the receiving device.

14. The electric plug-in device according to claim 9, wherein said pusher element is formed with a pressure surface which extends radially outward, as seen from said inner conductor, and lies on said insulating material.

15. The electric plug-in device according to claim 14, wherein a surface normal of said pressure surface lies parallel to a longitudinal axis of said inner conductor or at an angle with respect to said longitudinal axis.

* * * * *